# 3,366,369
DEVICE FOR MIXING AND TRANSFERRING UNDER VACUUM SPECIAL PASTES AND GYPSUM FOR USE IN DENTAL AND JEWELLER'S ART

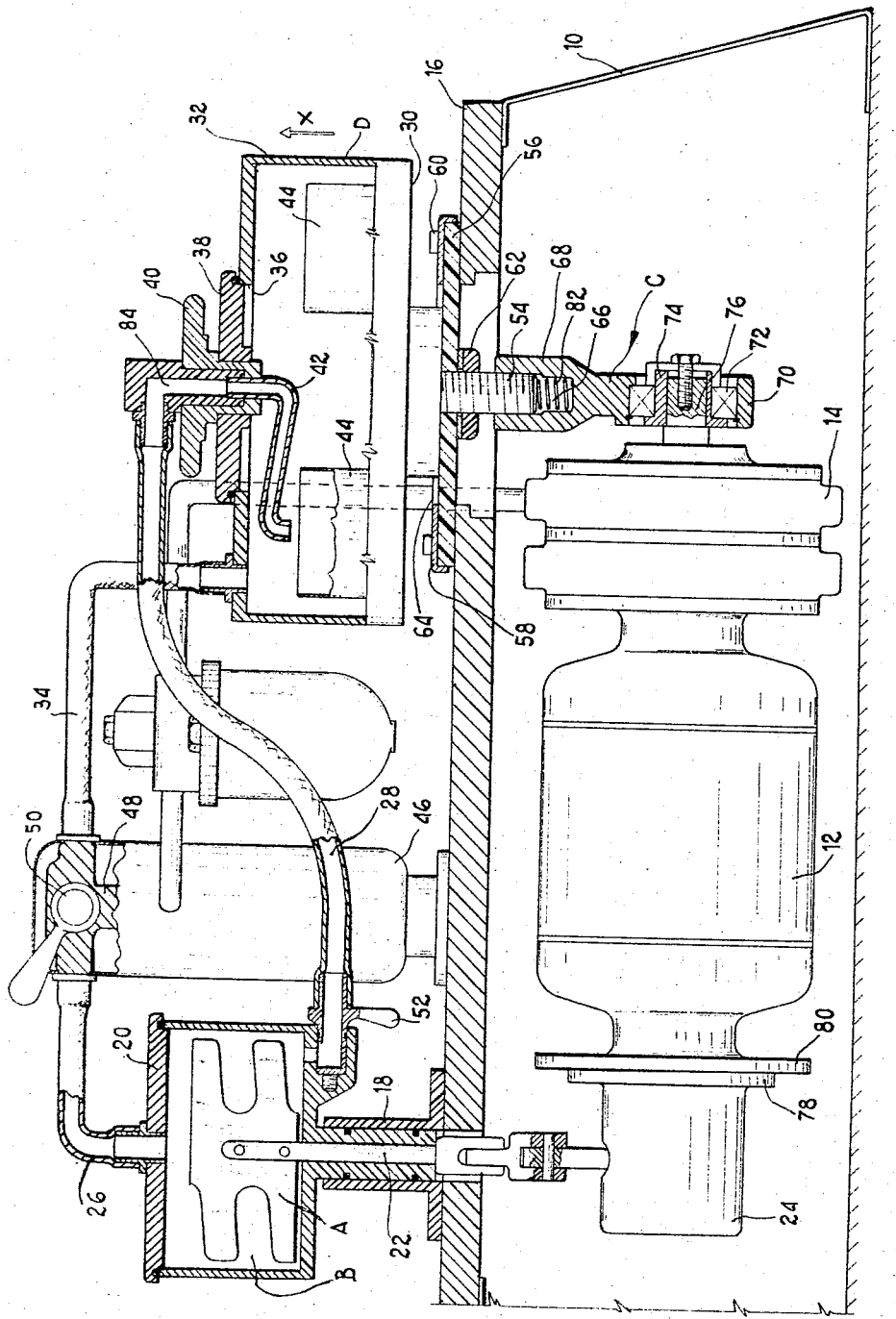

Angelo Ravasi, Olgiate Molgora, Italy, assignor to Giacinto Guido Fina, Milan, Italy
Filed Oct. 7, 1966, Ser. No. 585,068
4 Claims. (Cl. 259—67)

ABSTRACT OF THE DISCLOSURE

The device mixes and transfers under vacuum the pastes used in the dentistry and jewellery fields. It comprises a first chamber, a mixer in such chamber to mix the paste and a second chamber with vibrating means. Means are provided for driving the mixer and vibrating means and a controlled pneumatic circuit is designed to produce a vacuum alternately in the above chambers. Means are also provided wherein the paste mixed in the first chamber can be transferred under vacuum into the second chamber.

---

This invention relates to a device for mixing and transferring under vacuum special pastes and dental plasters, designed to take impressions and to make die forms in the dentistry and jewellery fields.

Many devices for mixing special pastes and dental plasters under vacuum as stated above are already known; however, they show many drawbacks, among other the complexity of their structure, with resulting high cost, the very restricted amount of paste and plaster (ab. ½ kg.) that can be processed each time, and the difficult distribution of mixed plaster.

It is therefore an object of this invention to provide a device capable of preventing the abovestated drawbacks; it comprises a first chamber, wherein a suitably controlled mixer is fitted, in order to mix the paste that is fed into said chamber; a second chamber, cooperating with mechanical vibrating means; driving means designed to alternately operate, under a suitable control, both the mixer and the vibrator; an expressly designed and suitably controlled pneumatic circuit, by which the possibility is given to alternately produce a vacuum in said first and second chambers; means by which said two chambers are connected with each other, and through which the paste, already processed by the mixer in the first chamber, is transferred under vacuum into the second chamber, and possibly delivery means for the paste, already transferred into said second chamber, as well as means designed to alternately produce a vacuum in either chamber.

The device according to the invention is advantageously fitted with one electric motor only, which shaft drives on one end the shaft of the mixer that is fitted in the first chamber, thus causing it to operate at a given r.p.m., while the vacuum pump, that can be alternately connected with either chambers, and the means by which the required vibrating motion is imparted to said second chamber, are driven by the opposite end of same motor shaft.

The above and further features of this invention will be disclosed in the following description, taken with the accompanying drawing, being both description and drawing given as a not restrictive example of a form of the invention.

The single figure in said drawing shows the device according to the invention, part sectioned on a longitudinal, vertical middle plane.

Referring now to said drawing, the mixing and vibrating device according to the invention (that is designed to process very large amounts of special pastes and dental plasters, particularly for dentistry and jewellery uses, e.g. from two to four kgs. of pastes each time) comprises a base or housing 10, wherein the motor 12 is fitted, being the shaft of said motor fitted at one end with means for driving the mixer A, that is located in the first chamber B, while the opposite end of same shaft is designed to drive the vacuum pump 14, as well as the means C by which a vibratory motion is mechanically imparted to second chamber D, as stated in more detail later on.

Fitted on top of housing 10 is a cover plate 16, and connected therewith through the bush 18 is the chamber B, conveniently raised from said cover plate 16 and tightly closed, at its top by a cover 20, that allows to charge the required amounts of paste or plaster into the same chamber.

Keyed on the upper end of shaft 22, that extends into the chamber D, is a mixer A, while the opposite end of the same shaft is connected with a reduction gear 24, that is in mesh with a pinion keyed on the shaft of electric motor 12, and that is adjusted in such a manner as to drive the mixer A at the most convenient angular speed, e.g. 300 r.p.m.

The chamber B is fitted with the pipe unions 26–28 for the pneumatic circuit, that is designed to produce a vacuum in the chambers B–D, and to have the already mixed paste transferred from the chamber B to chamber D.

Secured to bottom of said chamber D is a supporting dish 30, while a housing 32, fitted with the pipe union 34, is secured to top of same chamber. A central orifice 36, with which the chamber in question is formed, is closed by the stopper 38, to which the controllable distributor 40 is fastened. Said pipe union 28 has its outlet into said distributor, which is fitted with the rotary dispenser nozzle 42, for the delivery under vacuum of the paste already mixed in the chamber B, such delivery being controlled in such a manner as to have the required amount of paste poured into the containers 44, that are laid on the dish 30.

The circuit of air distribution and vacuum transferring of mixed paste also comprises the column 46, supported by the plate 16, and wherein the pipe 48 is fitted. One end of latter pipe is connected with the suction side of pump 14, while a two-way cock 50, fitted on the opposite end of the same pipe allows to have either the chamber B or the chamber D placed in communication with said pump. Fitted in the same circuit is also a second cock 52, which is to be opened when vacuum is produced in the chamber D, and closed when the chamber B is to be put under vacuum.

As regard to vibrating components C, it is to be noted that the stem 54 extending from the lower side of supporting plate 30, passes through a suitable orifice, with which the rubber disk 56 is formed, said conveniently dimensioned disk being secured, by the cover 58 and the screws 60, to plate 16. The plate 30 is locked, in respect to disk 56, by the nut 62, screwed onto the stem 54, in such a manner as to allow same plate and the related chamber D to be moved both in the direction of arrow X and in the opposite direction, due also to conveniently dimensioned openings 64, that are formed both in the plate 58 and in the plate 16.

Screwed onto the outer thread of stem 54 is the threaded seat 66 of connecting rod 68, that cooperates by its big end 70 and the bearing 72, with the eccentric 74, which is keyed on the end 76 of the shaft of the electric motor 12.

After what is stated before, the operation and performances of the previously described device will be apparent, and can be summarized as follows:

The device is predisposed for the operation by having a given amount of paste to be conveniently mixed charged into the chamber B, whereafter the cock 50 is switched in a position such that the pipe union 26 be in communication with the suction column 48 leading to the pump 14, while the cock 52 is closed, thereby cutting-out the pipe union 28.

Then, the electric motor 12 is switched-on, whereby the required torque is transmitted by the motor shaft through the reduction gear 24 that is connected through the flange 78 to flange 80 of the motor frame, to the shaft 22 carrying the mixer A, which is thus started at the required angular speed, e.g. of 300 r.p.m.

Simultaneously, the impeller of vacuum pump 14, which is flanged to related end of frame of motor 12, is also driven by the motor shaft, being such impeller operated at a much higher speed, e.g. 2800 r.p.m.

Moreover, the connecting rod 68 of vibrating unit C, is vertically reciprocated at a very high frequence; such motion is transmitted to stem 54 and thus to chamber D, whereby a mechanical vibratory motion is imparted to same chamber, due also to the presence of rubber disk 56, by which the plate 30 is supported. The stem 54 is acted upon by the spring 82, that is fitted into the recess of connecting rod 68 in the direction of the arrow X, whereby to take-up the slack which is gradually produced between the outer thread of stem 54 and the inner thread of said connecting rod seat.

In the course of the abovestated operational step, that can continue through a given time, the paste contained in the chamber B is conveniently mixed and wholly homogeneized by the mixer A, all air inclusions being efficiently removed, since the air bubbles on reaching the outer surface of the paste are instantaneously sucked off through the pipe union 26, the cock 50 and the duct 48 by the pump 14.

At the end of the vacuum mixing step, the cock 50 is switched into the position wherein the pipe union 26 is closed, while the pipe union 34 is placed in communication with the duct 48, and thus with the pump 14; moreover, the cock 52 is switched to a position wherein the pipe union 28 is open, thereby placing the chamber B in communication with the chamber D, through the suitably controlled distributor 40.

Thus, the air present in the tightly closed chamber D is sucked by the pump, whereby the required vacuum conditions are produced in the same chamber and as a consequence thereof, the homogeneously mixed paste is vacuum sucked, i.e. transferred from the chamber B through the pipe union 28 into the chamber D.

By means of the distributor 40, the nozzle 42 can be swung round the pipe 84, thereby delivering accurately metered amounts of the mixed paste into the different containers 44 wherein have previously been placed the molds, wherefrom the impressions are obtained.

The paste, when transferred into the chamber D, is yet kept under the best possible conditions, since mechanical vibrations are continuously imparted to the same chamber, whereby the homogenized condition of the paste is maintained, while due also to the action of vacuum produced in the chamber D, the yet possibly present air bubbles, by which the impression would be heavily damaged, are driven out.

Obviously, the under-vacuum mixed and already homogenized paste, could be cast directly onto the molds, without need to have it first transferred into the chamber D.

Many changes might be made in the above described device, as regard the mutual arrangement of the different components, the transmission of torque from the electric motor to mixer A, vacuum pump 14 and chamber D, which could be made in many other ways, different from the abovestated one, while the vacuum pump might be of the two or multistage type.

While the invention has been described with some detail, it is to be understood that the description is for the purpose of illustration only and many changes in the details of construction and arrangement of parts can be made without departing from the ambit of the invention, as defined in the appended claims.

What I claim is:

1. A device for mixing and transferring under vacuum special pastes and dental plasters, designed to take impressions and to make die forms in the dentistry and jewellery fields, comprising a first chamber, a controlled mixer in said chamber to mix the paste that is charged into said chamber; a second chamber, mechanical vibrating means for vibrating said second chamber, means for driving said mixer and said vibrating means; a controlled pneumatic circuit for producing a vacuum alternately in either of said chambers; means by which said chambers can be placed in mutual communication whereby the paste, already mixed by the mixer in said first chamber, can be transferred under vacuum into said second chamber; and means for the distribution of the transferred paste contained in said second chamber.

2. A device according to claim 1 wherein said driving means comprises an electric motor having a shaft to drive at one end said mixer at predetermined r.p.m. and at the other end a vacuum pump for said pneumatic circuit and said vibrating means.

3. A device according to claim 2 wherein said vibrating means comprises an eccentric keyed on said motor shaft, a connecting rod having one end connected to said eccentric, a stem extending downwardly from said second chamber secured to the other end of said connecting rod, and a resilient supporting disk secured to said stem so that the reciprocating motion of said connecting rod may be transmitted directly to said second chamber.

4. A device according to claim 1 wherein said pneumatic circuit comprises two cocks, the first of said cocks designed to have either of said chambers connected with the suction side to produce a vacuum in said first chamber or in said second chamber, and said second cock provides a communication between said two chambers which can be established or interrupted.

References Cited

UNITED STATES PATENTS

| 2,453,914 | 11/1948 | Hollenback | 259—8 |
| 2,879,042 | 3/1959 | Jones | 259—2 |
| 3,131,912 | 5/1964 | Steinbock | 259—108 |

FOREIGN PATENTS 975,174  11/1964  Great Britain.

ROBERT W. JENKINS, *Primary Examiner.*